(12) United States Patent
Kim (10) Patent No.: US 10,563,424 B2
(45) Date of Patent: Feb. 18, 2020

(54) ELECTRONIC KEY AND ELECTRONIC LOCKING DEVICE BASED ON DUAL AUTHENTICATION

(71) Applicant: Bum Soo Kim, Namyangju-si (KR)

(72) Inventor: Bum Soo Kim, Namyangju-si (KR)

( * ) Notice: Subject to any disclaimer, the term of this patent is extended or adjusted under 35 U.S.C. 154(b) by 18 days.

(21) Appl. No.: 15/736,906

(22) PCT Filed: Jun. 9, 2016

(86) PCT No.: PCT/KR2016/006100
§ 371 (c)(1),
(2) Date: Dec. 15, 2017

(87) PCT Pub. No.: WO2016/204446
PCT Pub. Date: Dec. 22, 2016

(65) Prior Publication Data
US 2018/0363327 A1 Dec. 20, 2018

(30) Foreign Application Priority Data
Jun. 15, 2015 (KR) .................. 10-2015-0084444

(51) Int. Cl.
*G05B 19/00* (2006.01)
*E05B 35/00* (2006.01)
(Continued)

(52) U.S. Cl.
CPC ............ *E05B 35/001* (2013.01); *E05B 47/00* (2013.01); *E05B 47/0001* (2013.01);
(Continued)

(58) Field of Classification Search
CPC ............ G07C 9/00142; G07C 9/00174; G07C 9/00309; G07C 2009/00761;
(Continued)

(56) References Cited

U.S. PATENT DOCUMENTS 5,749,253 A * 5/1998 Glick ...................... E05B 47/00
257/E29.081
6,331,812 B1 * 12/2001 Dawalibi ............ G07C 9/00817
340/5.2
(Continued)

FOREIGN PATENT DOCUMENTS

JP 2003-213994 A 7/2003
JP 2014-159692 A 9/2014
(Continued)

*Primary Examiner* — Kerri L McNally
*Assistant Examiner* — Thang D Tran
(74) *Attorney, Agent, or Firm* — Novick, Kim & Lee, PLLC; Sang Ho Lee (57) ABSTRACT

A dual authentication system of an electronic locking device using an electronic key according to an exemplary embodiment of the present invention includes a receiving unit that receives UID data pre-stored in the electronic key and encoding data generated by an input of a button provided in the electronic key, when a terminal portion provided in a key head of the electronic key is in electrical contact with a data communication unit of the electronic locking device; an authentication unit that performs dual authentication based on the UID data and the encoding data; and a command unit that commands the unlocking of the electronic locking device when the dual authentication on the UID data and the encoding data is successfully performed.

11 Claims, 4 Drawing Sheets

(51) Int. Cl.
*H04W 12/06* (2009.01)
*E05B 47/00* (2006.01)
*H04W 12/08* (2009.01)
*G07C 9/00* (2020.01)
*H04L 29/06* (2006.01)
*H04W 12/12* (2009.01)
*E05B 49/00* (2006.01)
*B60R 25/24* (2013.01)

(52) U.S. Cl.
CPC ........ *E05B 49/002* (2013.01); *G07C 9/00111* (2013.01); *G07C 9/00142* (2013.01); *G07C 9/00174* (2013.01); *G07C 9/00309* (2013.01); *H04L 63/083* (2013.01); *H04L 63/101* (2013.01); *H04W 12/06* (2013.01); *H04W 12/08* (2013.01); *H04W 12/1206* (2019.01); *B60R 25/24* (2013.01); *E05B 47/0012* (2013.01); *G07C 2009/00761* (2013.01)

(58) Field of Classification Search
CPC . G07C 9/00111; H04L 63/083; H04L 63/101; H04W 12/06; H04W 12/08; H04W 12/1206; B60R 25/24; E05B 47/0012; E05B 35/001; E05B 47/00; E05B 47/0001; G05B 47/002
USPC ........................................................ 340/5.61
See application file for complete search history.

(56) References Cited

U.S. PATENT DOCUMENTS

| | | | | |
|---|---|---|---|---|
| 6,552,650 | B1* | 4/2003 | Gokcebay | E05B 47/0611 340/5.65 |
| 6,842,105 | B1* | 1/2005 | Henderson | G07C 1/32 340/5.73 |
| 7,397,343 | B1* | 7/2008 | Gokcebay | E05B 47/0611 340/5.65 |
| 8,593,252 | B2* | 11/2013 | Fisher | G07C 9/00571 235/382 |
| 2004/0103702 | A1* | 6/2004 | Abeler | E05B 19/22 70/408 |
| 2004/0160305 | A1* | 8/2004 | Remenih | G07C 9/00103 340/5.22 |
| 2004/0243812 | A1* | 12/2004 | Yui | G07C 1/10 713/182 |
| 2007/0204663 | A1* | 9/2007 | Lee | E05B 47/00 70/279.1 |
| 2010/0144275 | A1* | 6/2010 | Satou | H04W 12/06 455/41.2 |
| 2010/0305779 | A1* | 12/2010 | Hassan | G01C 17/38 701/2 |
| 2012/0280783 | A1* | 11/2012 | Gerhardt | G07C 9/00309 340/5.6 |
| 2013/0187756 | A1* | 7/2013 | Fisher | G07C 9/00571 340/5.61 |
| 2013/0257590 | A1* | 10/2013 | Kuenzi | G05B 1/01 340/5.65 |
| 2013/0259232 | A1* | 10/2013 | Petel | H04L 63/0492 380/270 |
| 2013/0342314 | A1* | 12/2013 | Chen | G07C 9/00309 340/5.65 |
| 2014/0040621 | A1* | 2/2014 | Klimke | H04W 12/04 713/171 |
| 2014/0145823 | A1* | 5/2014 | Aase | G07C 9/00309 340/5.61 |
| 2014/0277837 | A1* | 9/2014 | Hatton | B60R 25/24 701/2 |
| 2015/0107316 | A1* | 4/2015 | Kirkjan | G07C 9/00182 70/275 |
| 2015/0195394 | A1* | 7/2015 | Bietz | H04M 1/7253 455/419 |
| 2015/0199863 | A1* | 7/2015 | Scoggins | G07C 9/00904 340/5.25 |
| 2016/0036788 | A1* | 2/2016 | Conrad | G07C 9/00571 713/168 |
| 2016/0358397 | A1* | 12/2016 | Kristensen | G07C 9/00309 |
| 2017/0127222 | A1* | 5/2017 | Lang | H04W 4/043 |

FOREIGN PATENT DOCUMENTS

| | | |
|---|---|---|
| JP | 2014-163105 A | 9/2014 |
| KR | 10-2005-0015000 A | 2/2005 |
| KR | 10-0722990 B1 | 5/2007 |
| KR | 10-1211477 B1 | 12/2012 |

* cited by examiner

ELECTRONIC KEY AND ELECTRONIC LOCKING DEVICE BASED ON DUAL AUTHENTICATION

TECHNICAL FIELD

Exemplary embodiments of the present invention relate to a dual authentication system of an electronic locking device using an electronic key.

BACKGROUND ART

Generally, in doors, lockers, and facilities of public buildings, apartments, hotels, factories, and the like, a locking device is installed to guard against security.

The locking device for the security may be largely divided into a mechanical locking device and an electronic locking device, and in the case of the mechanical locking device which opens and closes doors, lockers, and the like using a key, there is a problem in that the locking device needs to be replaced when the key is lost, in addition to the security problem due to the operation or storage of the key.

Considering the problem, electronic locking devices for opening and closing a door by using a password, a fingerprint and a voice of a user, or an electronic key have been frequently used. The market of the electronic locking device is growing rapidly in recent years because the electronic locking device has no need to worry about losing a key, general users may easily open and close doors, lockers, and the like through simple authentication, and the electronic locking device has excellent security.

However, when authentication information of the user which is used for opening and closing the electronic locking device is leaked, that is, when a person who is not authorized to open and close the electronic locking device knows the authentication information, there is a problem in unauthorized intrusion.

Accordingly, in order to solve the user's anxiety for opening and closing the electronic locking device, development of techniques of performing a dual authentication operation is required.

As related prior arts, there is disclosed Korean Patent Publication No. 10-2005-0015000 (Title of invention: Door lock system and operation method using portable terminal, Published Date: Feb. 21, 2005).

DISCLOSURE

Technical Problem

An object of the present invention is to provide a double authentication system of an electronic locking device using an electronic key capable of safely and efficiently locking and managing the electronic locking device by performing dual authentication of authenticating both UID data and encoding data using an electronic key which can be wirelessly connected to a mobile terminal.

The objects of the present invention are not limited to the aforementioned objects, and other objects, which are not mentioned above, will be apparent to a person having ordinary skill in the art from the following description.

Technical Solution

According to an exemplary embodiment of the present invention, there is provided a dual authentication system of an electronic locking device using an electronic key including: a receiving unit that receives UID data pre-stored in the electronic key and encoding data generated by an input of a button provided in the electronic key, when a terminal portion provided in a key head of the electronic key is in electrical contact with a data communication unit of the electronic locking device; an authentication unit that performs dual authentication based on the UID data and the encoding data; and a command unit that commands the unlocking of the electronic locking device when the dual authentication on the UID data and the encoding data is successfully performed.

According to another exemplary embodiment of the present invention, there is provided a dual authentication system of an electronic locking device using an electronic key including: a communication unit that performs wireless communication connection with a mobile terminal which pre-stores dual authentication information on the electronic locking device when a terminal portion provided in a key head of the electronic key is in electrical contact with a data communication unit of the electronic locking device; an authentication unit that transmits UID data pre-stored in the electronic locking device and the electronic key and encoding data generated by an input of a button provided in the electronic key and receives a dual authentication result on the UID data and the encoding data based on the dual authentication information from the mobile terminal, when the wireless communication connection with the mobile terminal is performed; and a command unit that commands the unlocking of the electronic locking device when the dual authentication on the UID data and the encoding data is successfully performed as the dual authentication result.

The authentication unit may include a UID data authentication unit that compares the UID data pre-stored in the electronic key with first authentication data pre-stored in the electronic locking device and performs authentication on the UID data based on the comparison result; and an encoding data authentication unit that compares encoding data generated by an input of a button provided in the electronic key with second authentication data pre-stored in the electronic locking device and performs authentication on the encoding data based on the comparison result.

The authentication unit may include a UID data authentication unit that compares the UID data pre-stored in the electronic key with first authentication data pre-stored in the electronic locking device and performs authentication on the UID data based on the comparison result; and an encoding data authentication unit that transmits encoding data generated by an input of a button provided in the electronic key to the mobile terminal and receives an authentication result for the encoding data from the mobile terminal, while the electronic key and the mobile terminal are paired through Bluetooth.

The communication unit may perform a pairing operation with the mobile terminal through Bluetooth.

The authentication unit may include a UID data authentication unit that transmits the UID data pre-stored in the electronic locking device and the electronic key to the mobile terminal and receives an authentication result from the mobile terminal according to the comparison result of the UID data and the first authentication data pre-stored in the mobile terminal; and an encoding data authentication unit that transmits input encoding data to the mobile terminal and receives an authentication result for the encoding data from the mobile terminal according to the comparison result of the input encoding data and the randomly output key value (second authentication data), when the encoding data is input by the button provided in the electronic key as a key value associated with the encoding data is randomly output to the mobile terminal.

The electronic key may receive a password generated by an application from the mobile terminal through wireless communication while being connected with the mobile terminal installed with the application for input setting of the UID data through wireless communication before a terminal portion provided in a key head of the electronic key is in electrical contact with a data communication unit of the electronic locking device and may be activated when the input key value coincides with the password when the key value is input by the button.

The electronic key may transmit the UID data to a relay device in which identification information on the electronic key is pre-stored when the terminal portion provided in the key head is in electrical contact with a data communication unit of the electronic locking device so that the relay device may transmit access-related information according to the identification information to a manager terminal.

The electronic key may transmit the UID data to a relay device in which identification information on the electronic key is pre-stored when the terminal portion provided in the key head is in electrical contact with a data communication unit of the electronic locking device so that the relay device may request approval information on the electronic key to the manager terminal and receive authority capable of performing dual authentication of the electronic locking device from the relay device when input information input by the manager terminal coincides with the approval information.

The electronic locking device may include a cylinder housing forming an outer appearance; and a cylinder plug which is positioned in the cylinder housing, rotatably installed in place, and locked or unlocked to the cylinder housing and into which the key head of the electronic key is detachably inserted, in which the cylinder plug may include a driving unit which receives a control signal for the dual authentication to be driven forward or backward; and a lock pin which is inserted into or withdrawn from a fixing hole of the cylinder housing according to the operation of the driving unit and controls the rotation of the cylinder plug.

The authentication unit may store log information on dual authentication of the UID data and the encoding data, in which the log information includes log information on whether or not the electronic key is authenticated, log information on an opening and closing time of the electronic locking device by the authenticated electronic key, log information on registration or change of a master electronic key, and log information on registration or change of a blacklist according to whether the electronic key is lost or not, in which the blacklist may be registered or changed by matching and storing UID data on the lost electronic key with the loss information by an external server which receives the loss information of the electronic key from the user terminal when the electronic key is lost.

Details of other exemplary embodiments will be included in the detailed description and the accompanying drawings.

Advantageous Effects

According to the exemplary embodiment of the present invention, it is possible to safely and efficiently lock and manage the electronic locking device by performing dual authentication of authenticating both UID data and encoding data using an electronic key which can be wirelessly connected to a mobile terminal.

Further, it is possible to unlock the electronic locking device by a simple and convenient authentication method and further improve security efficiency of the electronic locking device by performing the dual authentication of authenticating both UID data and encoding data based on wireless communication between the electronic key and the mobile terminal.

Further, it is possible to solve user's concern and anxiety about leakage of the authentication information and further perform conveniently the dual authentication operation.

BEST MODE

Advantages and features of the present invention, and methods for accomplishing the same will be more clearly understood from exemplary embodiments described below with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the disclosure, and the present invention will be defined by the appended claims. Throughout the whole specification, like reference numerals designate like components.

Hereinafter, exemplary embodiments of the present invention will be described in detail with reference to the accompanying drawings.

Figure 1:
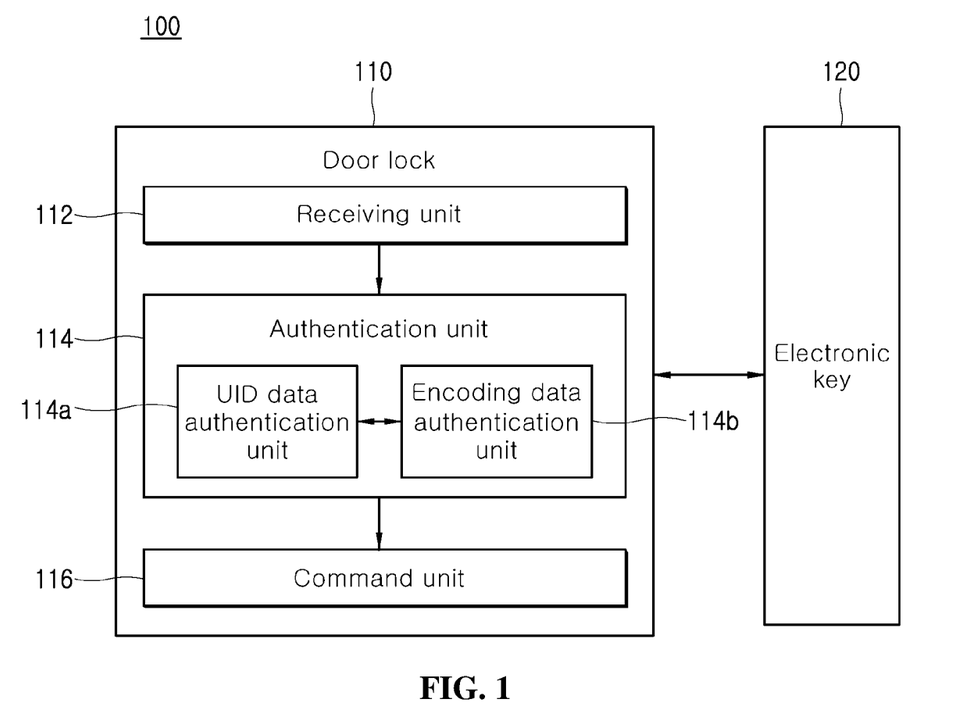
FIG. 1 is a block diagram illustrating a dual authentication system of an electronic locking device using an electronic key according to an exemplary embodiment of the present invention.

FIG. 1 is a block diagram illustrating a dual authentication system of an electronic locking device using an electronic key according to an exemplary embodiment of the present invention.

Referring to FIG. 1, a dual authentication system 100 for an electronic locking device using an electronic key according to an exemplary embodiment of the present invention includes an electronic locking device 110 and an electronic key 120.

The electronic locking device 110 includes a receiving unit 112, an authentication unit 114, and a command unit 116.

The receiving unit 112 may receive unique ID (UID) data pre-stored in the electronic key 120 when a terminal portion (see "313" of FIG. 3) provided in a key head (see "312" of FIGS. 3 and 4) of the electronic key 120 is electronically in contact with a data communication unit (not illustrated) of the electronic locking device 110.

That is, the receiving unit 112 may receive the UID data preset in the electronic key 120 from the electronic key 120.

The receiving unit 112 may receive encoding data generated by input of a button (not illustrated) provided in the electronic key 120 when the electronic key 120 is inserted into the electronic locking device 110 and in electrical contact with the electronic locking device 110, like the case of receiving the UID data.

That is, the receiving unit 112 may receive the encoding data input by the user through the button from the electronic key 120. Here, the button is an operation key for inputting a key value, and the key value may include numbers, symbols, characters, and the like. For reference, the button may also not be included in the electronic key 120.

The authentication unit 114 performs dual authentication based on the UID data and the encoding data.

To this end, the authentication unit 114 may include a UID data authentication unit 114a and an encoding data authentication unit 114b, which perform the dual authentication.

Hereinafter, various exemplary embodiments of the authentication unit 114 including the UID data authentication unit 114a and the encoding data authentication unit 114b will be described.

For reference, an authentication order performed by the UID data authentication unit 114a and the encoding data authentication unit 114b is irrelevant. For example, when the UID data authentication unit 114a performs an approval process after performing the authentication on the UID data, the encoding data authentication unit 114b may perform authentication on the encoding data. On the contrary, when the encoding data authentication unit 114b performs an approval process after performing the authentication on the encoding data, the UID data authentication unit 114a may perform authentication on the UID data.

In one embodiment, the UID data authentication unit 114a may compare the UID data pre-stored in the electronic key 120 with first authentication data pre-stored in the electronic locking device 110 and perform the authentication on the UID data based on the comparison result.

That is, the UID data authentication unit 114a may perform the authentication on the UID data by determining whether the UID data received from the electronic key 120 coincides with the first authentication data.

In other words, when it is determined that the UID data received from the electronic key 120 is the same as the first authentication data, the UID data authentication unit 114a performs the approval process (authentication success) on the UID data, and when it is determined that the UID data received from the electronic key 120 is not the same as the first authentication data, the UID data authentication unit 114a may perform disposal (authentication failure) on the UID data.

The encoding data authentication unit 114b may compare the encoding data generated by input of the button provided in the electronic key 120 with second authentication data pre-stored in the electronic locking device 110 and perform the authentication on the encoding data based on the comparison result.

That is, the encoding data authentication unit 114b may perform the authentication on the encoding data by determining whether the encoding data received from the electronic key 120 coincides with the second authentication data.

In other words, when it is determined that the encoding data received from the electronic key 120 is the same as the second authentication data, the encoding data authentication unit 114b performs the approval process (authentication success) on the encoding data, and when it is determined that the encoding data received from the electronic key 120 is not the same as the second authentication data, the encoding data authentication unit 114b may perform disposal (authentication failure) on the encoding data.

In another embodiment, the UID data authentication unit 114a may compare the UID data pre-stored in the electronic key 120 with first authentication data pre-stored in the electronic locking device 110 and perform the authentication on the UID data based on the comparison result.

Herein, since the UID data authentication unit 114a performs the same or similar function as and to the one embodiment, in another embodiment, the description thereof will be omitted.

However, since the encoding data authentication unit 114b of another embodiment differs from that of the one embodiment, the encoding data authentication unit 114b will be described in detail below.

The encoding data authentication unit 114b may output messages (such as voice or texts) for Bluetooth pairing between the electronic key 120 and the mobile terminal for authentication on the encoding data generated by the input of the button provided in the electronic key 120.

A user may activate a Bluetooth module of the mobile terminal and as a result, the electronic key 120 and the mobile terminal may be paired through Bluetooth.

At this time, the encoding data authentication unit 114b may transmit the encoding data generated by the input of the button provided in the electronic key 120 to the mobile terminal and receive the authentication result for the encoding data from the mobile terminal.

Herein, the mobile terminal may compare the encoding data received from the electronic key 120 with the second authentication data pre-stored in the mobile terminal to perform the authentication on the encoding data. That is, the mobile terminal may determine whether the encoding data received from the electronic key 120 coincides with the second authentication data and perform authentication on the encoding data according to the determination result.

When the encoding data authentication unit 114b receives an approval process (authentication success) message as the authentication result for the encoding data from the mobile terminal, the encoding data authentication unit 114b performs an approval process on the encoding data, and when receiving a disposal (authentication failure) message as the authentication result for the encoding data, the encoding data authentication unit 114b may perform the disposal on the encoding data.

The authentication unit 114 may store and manage all log information related to the dual authentication of the UID data and the encoding data at the time of dual authentication through the UID data authentication unit 114a and the encoding data authentication unit 114b.

Herein, the log information may include, for example, log information on whether or not the electronic key 120 is authenticated, log information on an opening and closing time of the electronic locking device 110 by the authenticated electronic key 120, log information on registration or change of a master electronic key 120, and log information on registration or change of a blacklist according to whether the electronic key 120 is lost or not.

Herein, when the electronic key 120 is lost, an external server receiving loss information of the electronic key 120 from the user terminal matches and stores the UID data on the lost electronic key 120 with the loss information to register or change the blacklist.

Particularly, when the user loses the electronic key 120, the user inputs the loss information of the electronic key 120 to the external server through the user terminal and the external server matches and stores the loss information with the UID data on the electronic key 120 to register or change the blacklist. Herein, the user terminal corresponds to the mobile terminal, and the loss information may include the UID data of the electronic key 120 and data on whether the electronic key is lost or not.

When an attempt to unlock the electronic locking device 110 is made by the electronic key 120, the authentication unit 114 receives the blacklist from the external server to determine whether the electronic key 120 is registered in the blacklist and may maintain the locking state of the electronic locking device 110 when the electronic key 120 is registered in the blacklist.

In this case, the authentication unit 114 may not perform the dual authentication process of the lost electronic key 120 and may transmit to the external server an alarm message that the attempt to unlock the electronic locking device 110 is made by the electronic key 120.

Meanwhile, when the user acquires the lost electronic key 120, the user terminal may transmit acquisition information of the lost electronic key 120 to the external server. Accordingly, the external server may change (delete) the blacklist corresponding to the acquisition information.

Meanwhile, before the authentication unit 114 performs the dual authentication, the electronic key 120 may perform a key activation operation.

For example, before the terminal portion provided in the key head of the electronic key 120 is in electrical contact with the data communication unit of the electronic locking device 110, while the electronic key 120 is wirelessly connected with the mobile terminal mounted with an application for setting the input of the UID data, the electronic key 120 may receive a password generated by the application from the mobile terminal through wireless communication.

In this case, when a key value is input by the button provided on the electronic key 120, the electronic key 120 determines whether the input key value coincides with the password and may be activated when it is determined that the input key value coincides with the password.

That is, the electronic key 120 may have a function of performing the dual authentication after the key value input by the user through the button is the same as the password received from the mobile terminal.

Unlike this, the electronic key 120 may preset a default value for key activation therein before the terminal portion provided in the key head of the electronic key 120 is in electrical contact with the data communication unit of the electronic locking device 110.

In this case, when the key value is input by the button provided on the electronic key 120, the electronic key 120 determines whether the input key value coincides with the default value and may be activated when it is determined that the input key value coincides with the default value.

That is, the electronic key 120 may have a function of performing the dual authentication after the key value input by the user through the button is the same as the default value.

In one exemplary embodiment of the present invention, it is described that the authentication unit 114 performs the key activation operation using the electronic key 120, but the present invention is not limited thereto and the key activation operation may also be performed through biometrics using a fingerprint, a blood vessel, an iris, and the like.

The command unit 116 commands the unlocking of the electronic locking device 110 when the dual authentication on the UID data and the encoding data is successfully performed.

That is, the command unit 116 may instruct the electronic locking device 110 to be opened after the dual authentication on the UID data and the encoding data in the authentication unit 114 is passed. To this end, the command unit 116 may transmit a control signal for the unlocking to a driving unit (see "418" of FIG. 4) of the electronic locking device 110.

On the other hand, the command unit 116 may instruct the locking state of the electronic locking device 110 to be maintained when the authentication on any one of the UID data and the encoding data is failed in the authentication unit 114.

Thus, according to the exemplary embodiment of the present invention, the electronic locking device 110 performs the dual authentication through authentication on each of the UID data and the encoding data, thereby improving the security efficiency of the electronic locking device 110.

Meanwhile, in the exemplary embodiment of the present invention, when the unlocking of the electronic locking device 110 is attempted from the outside, the electronic locking device 110 may transmit information on who is approached to the manager of the electronic locking device 110 through texts or e-mail.

To this end, the electronic key 120 may transmit the UID data to a relay device (not illustrated) in which identification information on the electronic key 120 is pre-stored. Accordingly, the relay device compares the UID data received from the electronic key 120 with the pre-stored identification information on the electronic key 120 to determine access information on the electronic locking device 110.

Accordingly, the electronic key 120 may allow the relay device to transmit the access information according to the identification information to a manager terminal (not illustrated). The exemplary embodiment may be equally applied to another exemplary embodiment of FIG. 2.

Meanwhile, in the exemplary embodiment of the present invention, in the case of attempting the unlocking of the electronic locking device 110 from the outside, the electronic key 120 requests approval information on the electronic locking device 110 to the manager of the electronic locking device 110. As a result, when the manager inputs the approval information, the manager may give authority accessible to the electronic locking device 110 to the electronic key 120 carried by an accessor of the electronic locking device 110.

To this end, the electronic key 120 transmits the UID data to the relay device in which the identification information on the electronic key 120 is pre-stored, and the relay device may request the approval information on the electronic key 120 to the manager terminal.

Accordingly, when input information input from the manager terminal coincides with the approval information, the electronic key 120 may receive authority to perform dual authentication of the electronic locking device 110 from the relay device. The above exemplary embodiment may be also equally applied to another exemplary embodiment of FIG. 2.

Figure 2:
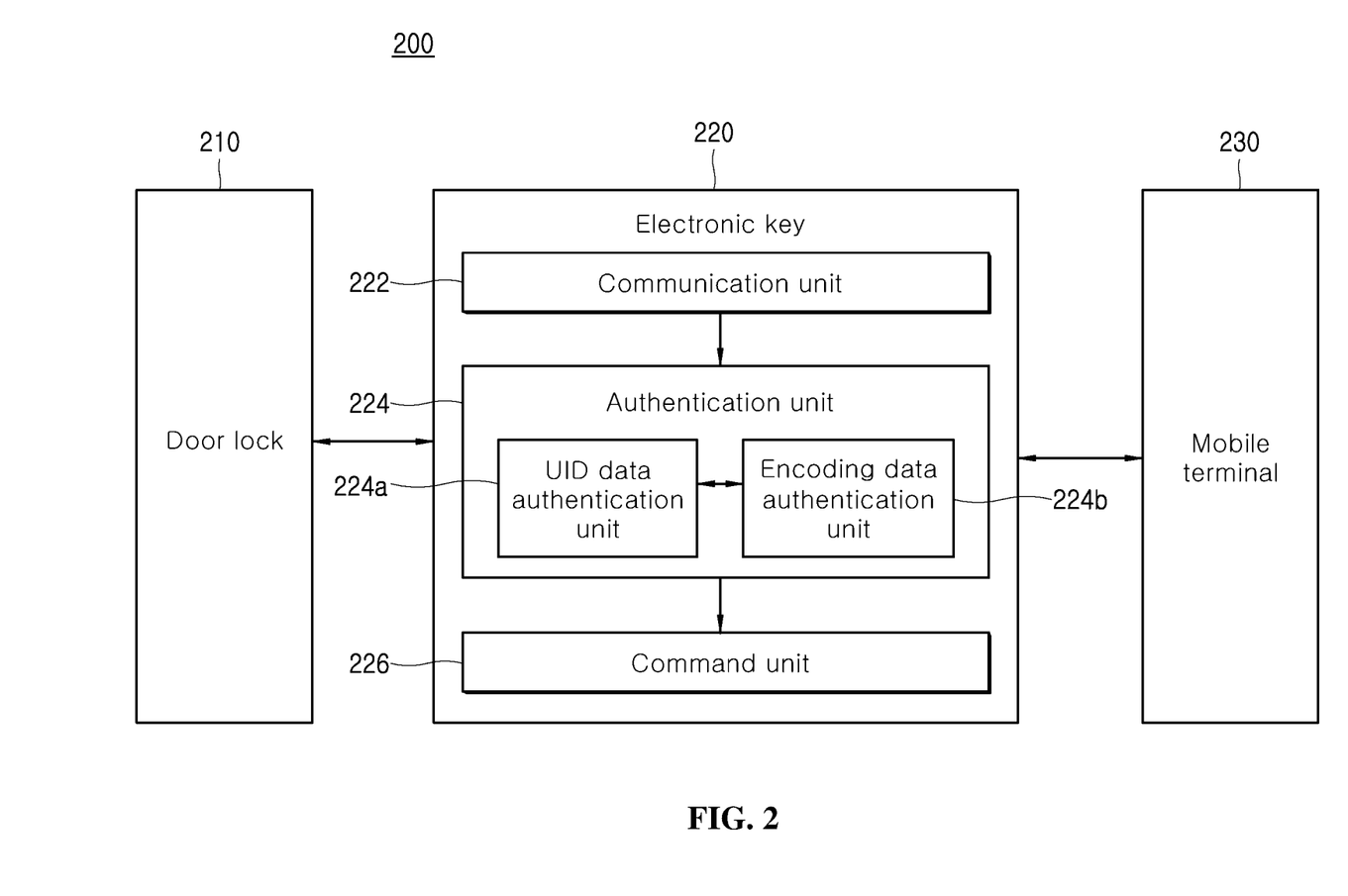
FIG. 2 is a block diagram illustrating a dual authentication system of an electronic locking device using an electronic key according to another exemplary embodiment of the present invention.

FIG. 2 is a block diagram illustrating a dual authentication system of an electronic locking device using an electronic key according to another exemplary embodiment of the present invention.

Referring to FIG. 2, a dual authentication system 200 for an electronic locking device using an electronic key according to another exemplary embodiment of the present invention includes an electronic locking device 210, an electronic key 220, and a mobile terminal 230. Although not illustrated, the dual authentication system 200 for the electronic locking device may further include an external server interlocking with the mobile terminal 230.

The electronic key 220 includes a communication unit 222, an authentication unit 224, and a command unit 226.

When a terminal portion provided in a key head of the electronic key 220 is in electrical contact with a data communication unit of the electronic locking device 210, the communication unit 222 performs wireless communication connection with the mobile terminal 230 which pre-stores dual authentication information on the electronic locking device 210.

At this time, the communication unit 222 may be wirelessly connected to the mobile terminal 230 by performing a pairing operation with the mobile terminal 230 through Bluetooth.

Herein, the mobile terminal 230 may download the dual authentication information on the electronic locking device 210 from the external server. Herein, the dual authentication information on the electronic locking device 210 may include information on an available electronic locking device 210 and the electronic key 220, information matched between the available electronic locking device 210 and the electronic key 220, and the like.

The authentication unit 224 transmits UID data pre-stored in the electronic lock device 210 and the electronic key 220 and encoding data generated by an input of a button provided in the electronic key 220 to the mobile terminal 230 when the wireless communication connection with the mobile terminal 230 is performed. The mobile terminal 230 may perform dual authentication on the UID data and the encoding data based on the dual authentication information and transmit the result to the electronic key 220.

That is, the authentication unit 224 receives dual authentication result on the UID data and the encoding data based on the dual authentication information from the mobile terminal 230.

To this end, the authentication unit 224 may include a UID data authentication unit 224a and an encoding data authentication unit 224b which receive the dual authentication result on the UID data and the encoding data from the mobile terminal 230.

The UID data authentication unit 224a transmits the UID data pre-stored in the electronic locking device 210 and the electronic key 220 to the mobile terminal 230 and may receive from the mobile terminal 230 the authentication result according to the comparison result of the UID data and the first authentication data pre-stored in the mobile terminal 230.

At this time, the mobile terminal 230 compares the UID data received from the electronic key 220 with the first authentication data to determine whether the UID data coincides with the first authentication data, and may transmit the authentication result to the electronic key 220 by performing the authentication on the UID data according to the determination result.

When the UID data authentication unit 224a receives an approval process (authentication success) message as the authentication result for the UID data from the mobile terminal 230, the UID data authentication unit 224a performs an approval process on the UID data, and when the UID data authentication unit 224a receives a disposal (authentication failure) message as the authentication result for the UID data, the UID data authentication unit 224a may perform the disposal on the UID data.

When the encoding data is input by the button provided in the electronic key 220 while the key value associated with the encoding data is randomly output to the mobile terminal 230, the encoding data authentication unit 224b may transmit the input encoding data to the mobile terminal 230.

Particularly, for authentication on the encoding data which is one of the dual authentication, the encoding data authentication unit 224b commands the random output of the key value to the mobile terminal 230. Accordingly, the mobile terminal 230 may randomly output a key value associated with the encoding data to display the key value on a screen. At this time, the user operates the button provided in the electronic key 220 to input the encoding data, and the encoding data authentication unit 224b may transmit the input encoding data to the mobile terminal 230.

The encoding data authentication unit 224b may receive from the mobile terminal 230 the authentication result according to the comparison result of the input encoding data and the randomly output key value (second authentication data).

At this time, the mobile terminal 230 compares the encoding data received from the electronic key 220 with the second authentication data to determine whether the encoding data coincides with the second authentication data, and may transmit the authentication result to the electronic key 220 by performing the authentication on the encoding data according to the determination result.

When the encoding data authentication unit 224b receives an approval process (authentication success) message as the authentication result for the encoding data from the mobile terminal 230, the encoding data authentication unit 224b performs an approval process on the encoding data, and when the encoding data authentication unit 224b receives a disposal (authentication failure) message as the authentication result for the encoding data, the encoding data authentication unit 224b may perform the disposal on the encoding data.

The authentication unit 224 may store and manage all log information associated with the dual authentication of the UID data and the encoding data at the time of dual authentication through the UID data authentication unit 224a and the encoding data authentication unit 224b.

Herein, since the storing and managing operation of the log information of the authentication unit 224 is the same as or similar to the operation performed by the authentication unit 114 in one exemplary embodiment of the present invention, in another exemplary embodiment of the present invention, the description thereof will be omitted.

Meanwhile, before the authentication unit 224 performs the dual authentication, the electronic key 220 may perform a key activation operation.

Herein, since the key activation operation of the electronic key 220 is the same as or similar to the operation performed by the electronic key 110 in one exemplary embodiment of the present invention, in another exemplary embodiment of the present invention, the description thereof will be omitted.

In another exemplary embodiment of the present invention, it is described that the authentication unit 224 performs the key activation operation using the electronic key 220, but the present invention is not limited thereto and the key activation operation may also be performed through biometrics using a fingerprint, a blood vessel, an iris, and the like.

The command unit 226 commands the unlocking of the electronic locking device 210 when the dual authentication on the UID data and the encoding data is successfully performed.

Herein, since the unlocking operation of the command unit 226 is the same as or similar to the operation performed by the command unit 116 of the electronic locking device 110 in one exemplary embodiment of the present invention, in another exemplary embodiment of the present invention, the description thereof will be omitted.

As such, in another exemplary embodiment of the present invention, it is possible to unlock the electronic locking device 210 by a simple and convenient authentication method and further improve security efficiency of the electronic locking device 110 by performing the dual authentication using the UID data and the encoding data based on wireless communication between the electronic key 220 and the mobile terminal 230.

Further, according to the exemplary embodiment, it is possible to solve user's concern and anxiety about leakage of the authentication information and further perform conveniently the dual authentication operation.

Figure 3:
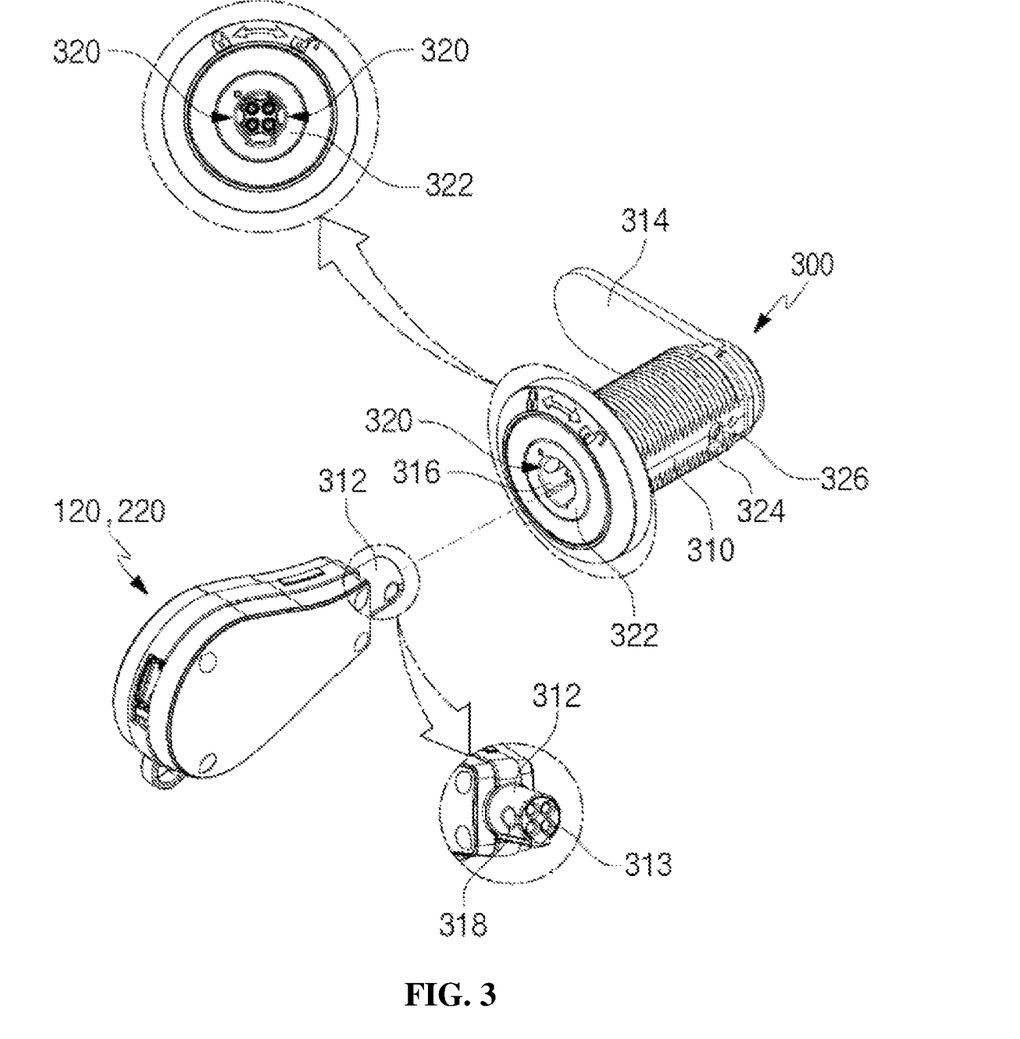
FIG. 3 is a perspective view illustrating structures of the electronic key and the electronic locking device illustrated in FIGS. 1 and 2 in detail.
Figure 4:
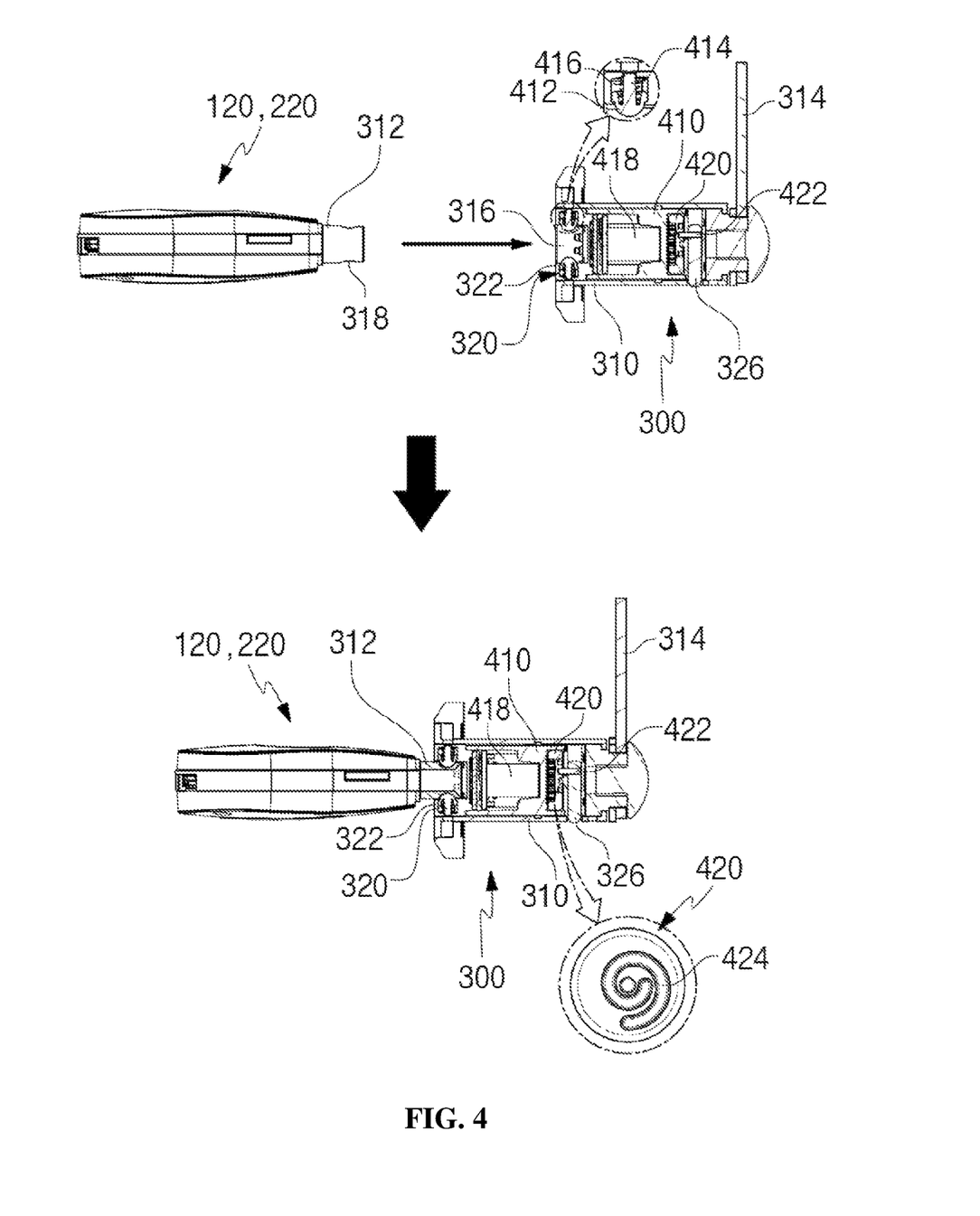
FIG. 4 is a cross-sectional view illustrating before and after connecting the electronic key and the electronic locking device illustrated in FIGS. 1 and 2.

FIG. 3 is a perspective view illustrating structures of the electronic keys 120 and 220 and the electronic locking devices 110 and 210 illustrated in FIGS. 1 and 2 in detail and FIG. 4 is a cross-sectional view illustrating before and after connecting the electronic keys 120 and 220 and the electronic locking devices 110 and 210 illustrated in FIGS. 1 and 2.

As illustrated in FIGS. 3 and 4, an electronic locking device 300 includes a cylinder housing 310 and a cylinder plug 410.

The cylinder housing 310 forms an outer appearance, and the cylinder housing 310 is formed in a hollow cylindrical shape as an example, and a screw thread is formed on an outer circumferential surface of the cylinder housing 310 to be screwed into a coupling hole formed in a door or the like.

The cylinder plug 410 is positioned in the cylinder housing 310 and rotatably installed in place, and the cylinder plug 410 is locked or unlocked to the cylinder housing 310 and a latch bolt 314 is coupled to the cylinder plug 410 so that the latch bolt 314 rotates together according to the rotation of the cylinder plug 410.

Meanwhile, in the cylinder plug 410, a data communication unit (not illustrated) to which a key head 312 of the electronic keys 120 and 220 is detachably inserted and which is in electrical contact with a terminal portion 313 of the key head 312 is provided, and a lock head 322 which has a second support 320 corresponding to a first support 318 formed in the key head 312 to fix the electronic keys 120 and 220 may be provided.

That is, a key insertion hole 316 is formed in the lock head 322 provided in the cylinder plug 410 so that the key head 312 of the electronic keys 120 and 220 is detachably inserted. A plurality of data communication units are provided on the bottom (that is, an opposite surface in an opened direction) of the key insertion hole 316 and in electrical contact with the terminal portion 313 provided in the key head 312 when the key head 312 of the electronic keys 120 and 220 is inserted into the key insertion hole 316, so that the power, the UID data, and the encoding data are transmitted to the cylinder plug 410 from the electronic keys 120 and 220.

Meanwhile, the second support 320 is formed on the lock head 322, and the second support 320 corresponds to the first support 318 formed on the key head 312 of the electronic keys 120 and 220 to fix and support the key head 312 inserted into the key insertion hole 316.

When describing an example for the structures of the first support 318 and the second support 320 in detail, the first support 318 is formed on the outer circumferential surface of the key head 312 as a concavely recessed groove, and the second support 320 is provided on a circumferential surface of the key insertion hole 316 to which the key head 312 is inserted, corresponds to the first support 318, and may be formed as an elastically supported protrusion.

That is, the second support 320 may have a structure in which a head portion 412 exposed to the outside from the circumferential surface of the key insertion hole 316 is rounded and an elastic body 416 is coupled to the outer circumferential side of a guide shaft 414 integrally extended from the head 412.

Accordingly, when the key head 312 is inserted into the key insertion hole 316, the head 412 of the second support 320 is pushed and protruded by the elastic restoring force of the elastic body 416 to press and support the first support 318 of the key head 312, and as a result, the electronic keys 120 and 220 are not be easily detached from the cylinder plug 410.

Of course, the objects of forming the first support 318 and the second support 320 described above may also be interchanged, and that is, the first support 318 may be formed on the outer circumferential surface of the key head 312 as an elastically supported protrusion, and the second support 320 may also be provided on a circumferential surface of the key insertion hole 316 to which the key head 312 is inserted to correspond to the first support 318 as a concavely recessed groove.

Meanwhile, the cylinder plug 410 may include a driving unit 418 that receives a control signal for the dual authentication to be driven forward or backward and a lock pin 326 which is inserted into or withdrawn from a fixing hole 324 of the cylinder housing 310 according to the operation of the driving unit 418 and controls the rotation of the cylinder plug 410.

The driving unit 418 receives the control signal to be driven forward or backward, and the driving unit 418 may be provided as, for example, an electric motor.

Herein, when describing the structure in which the lock pin 326 is operated according to the operation of the driving unit 418 in detail, a spur gear is coupled to a driving shaft of the driving unit 418, a direction switching rotary ring 420 having an internal gear formed on one side so that the spur gear is eccentrically inscribed and a spiral groove 424 formed at the other side is provided, and a moving shaft 422 of which one end is inserted into the spiral groove 424 and the other end is coupled with the lock pin 326 is provided. Accordingly, when the driving shaft is driven forward or backward according to the operation of the driving unit 418, the direction switching rotary ring 420 rotates in one direction or the other direction, and as a result, while the moving shaft 422 moves along the spiral groove 424 of the direction switching rotary ring 420, the lock pin 326 moves forward or backward (that is, the lock pin 326 is inserted into or withdrawn from the fixing hole 324 of the cylinder housing 310), thereby controlling whether the cylinder plug 410 rotates in the cylinder housing 310.

Although the exemplary embodiments of the present invention have been described, of course, various modifications can be made without departing from the technical concept of the present invention. Therefore, the scope of the present invention should not be limited to the exemplary embodiments described above and should be determined by appended claims and equivalents to the appended claims in addition to the scope of the following claims.

As described above, although the present invention is described by the restrictive exemplary embodiments and the drawings, the present invention is not limited to the exemplary embodiments, and it will be apparent to those skilled in the art that various modifications and variations can be made from the disclosure. Therefore, the spirit of the present invention should be construed based on only the appended claims, and all equivalent or equal modifications thereof should be construed as falling within the scope of the present invention.

The invention claimed is:

1. An electronic locking device based on dual authentication, comprising:
   a receiving unit that receives Unique Identification (UID) data pre-stored in an electronic key and encoding data generated by an input of a button provided in the electronic key, when a terminal portion provided in a key head of the electronic key is in electrical contact with a data communication unit of the electronic locking device;
   an authentication unit that performs dual authentication based on the UID data and the encoding data; and
   a command unit that commands the unlocking of the electronic locking device when the dual authentication on the UID data and the encoding data is successfully performed,
   wherein the authentication unit includes
      an UID data authentication unit that compares the UID data pre-stored in the electronic key with first authentication data pre-stored in an electronic locking device and performs authentication on the UID data based on the comparison result; and
      an encoding data authentication unit that transmits encoding data generated by the input of a button provided in the electronic key to a mobile terminal and receives an authentication result for the encoding data from the mobile terminal, while the electronic key and the mobile terminal are paired.

2. The electronic locking device based on dual authentication of claim 1, wherein the electronic key receives a password generated by an application from the mobile terminal through wireless communication while being connected with the mobile terminal installed with the application for input setting of the UID data before the terminal portion provided in the key head of the electronic key is in electrical contact with a data communication unit of the electronic locking device and is activated when the input key value coincides with the password when the key value is input by the button.

3. The electronic key based on dual authentication of claim 1, wherein the authentication unit stores log information on dual authentication of the UID data and the encoding data, in which the log information includes log information on whether or not the electronic key is authenticated, log information on an opening and closing time of the electronic locking device by the authenticated electronic key, log information on registration or change of a master electronic key, and log information on registration or change of a blacklist according to whether the electronic key is lost or not,
   wherein the blacklist is registered or changed by matching and storing UID data on the lost electronic key with the loss information by an external server which receives the loss information of the electronic key from the user terminal when the electronic key is lost.

4. An electronic key based on dual authentication, comprising:
   a communication unit that performs wireless communication connection with a mobile terminal which pre-stores dual authentication information on an electronic locking device when a terminal portion provided in a key head of the electronic key is in electrical contact with a data communication unit of the electronic locking device;
   an authentication unit that transmits UID data pre-stored in the electronic locking device and the electronic key and encoding data generated by an input of a button provided in the electronic key and receives a dual authentication result on the UID data and the encoding data based on the dual authentication information from the mobile terminal, when the wireless communication connection with the mobile terminal is performed; and
   a command unit that commands the unlocking of the electronic locking device when the dual authentication on the UID data and the encoding data is successfully performed as the dual authentication result,
   wherein the electronic key receives a password generated by an application from the mobile terminal through wireless communication while being connected with the mobile terminal installed with the application for input setting of the UID data before the terminal portion provided in the key head of the electronic key is in electrical contact with a data communication unit of the electronic locking device and is activated when the input key value coincides with the password when the key value is input by the button.

5. The electronic key based on dual authentication of claim 4, wherein the communication unit performs a pairing operation with the mobile terminal through Bluetooth.

6. The electronic key based on dual authentication of claim 4, wherein the authentication unit includes
   a UID data authentication unit that transmits the UID data pre-stored in the electronic locking device and the electronic key to the mobile terminal and receives an authentication result from the mobile terminal according to the comparison result of the UID data and the first authentication data pre-stored in the mobile terminal; and
   an encoding data authentication unit that transmits input encoding data to the mobile terminal and receives an authentication result for the encoding data from the mobile terminal according to the comparison result of the input encoding data and the randomly output key value (second authentication data), when the encoding data is input by the button provided in the electronic key as a key value associated with the encoding data is randomly output to the mobile terminal.

7. The electronic key based on dual authentication of claim 4, wherein the electronic key transmits the UID data to a relay device in which identification information on the electronic key is pre-stored when the terminal portion provided in the key head is in electrical contact with the data communication unit of the electronic locking device so that the relay device transmits access-related information according to the identification information to a manager terminal.

8. The electronic key based on dual authentication of claim 4, wherein the electronic key transmits the UID data to a relay device in which the identification information on the electronic key is pre-stored when the terminal portion provided in the key head is in electrical contact with the data communication unit of the electronic locking device so that the relay device requests approval information on the electronic key to the manager terminal and receives authority for performing dual authentication of the electronic locking device from the relay device when input information input by the manager terminal coincides with the approval information.

9. The electronic key based on dual authentication of claim 4, wherein the electronic locking device includes
a cylinder housing forming an outer appearance; and
a cylinder plug which is positioned in the cylinder housing, rotatably installed in place, and locked or unlocked to the cylinder housing and into which the key head of the electronic key is detachably inserted,
wherein the cylinder plug includes
a driving unit which receives a control signal for the dual authentication to be driven forward or backward; and
a lock pin which is inserted into or withdrawn from a fixing hole of the cylinder housing according to the operation of the driving unit and controls the rotation of the cylinder plug.

10. An electronic key based on dual authentication, comprising:
a communication unit that performs wireless communication connection with a mobile terminal which pre-stores dual authentication information on an electronic locking device when a terminal portion provided in a key head of the electronic key is in electrical contact with a data communication unit of the electronic locking device;
an authentication unit that transmits UID data pre-stored in the electronic locking device and the electronic key and encoding data generated by an input of a button provided in the electronic key and receives a dual authentication result on the UID data and the encoding data based on the dual authentication information from the mobile terminal, when the wireless communication connection with the mobile terminal is performed; and
a command unit that commands the unlocking of the electronic locking device when the dual authentication on the UID data and the encoding data is successfully performed as the dual authentication result,
wherein the authentication unit stores log information on dual authentication of the UID data and the encoding data, in which the log information includes log information on whether or not the electronic key is authenticated, log information on an opening and closing time of the electronic locking device by the authenticated electronic key, log information on registration or change of a master electronic key, and log information on registration or change of a blacklist according to whether the electronic key is lost or not,
wherein the blacklist is registered or changed by matching and storing UID data on the lost electronic key with the loss information by an external server which receives the loss information of the electronic key from the user terminal when the electronic key is lost.

11. An electronic key based on dual authentication, comprising:
a communication unit that performs wireless communication connection with a mobile terminal which pre-stores authentication information on an electronic locking device when a terminal portion provided in a key head of the electronic key is in electrical contact with a data communication unit of the electronic locking device;
an authentication unit that performs a key activation operation for the electronic key through biometrics, transmits UID data pre-stored in the electronic locking device and the electronic key to the mobile terminal when the wireless communication connection with the mobile terminal is performed after the key activation operation is performed, and receives an authentication result for the UID data based on the authentication information from the mobile terminal; and
a command unit that commands the unlocking of the electronic locking device, when the authentication on the UID data is successfully performed as the authentication result,
wherein the electronic key receives a password generated by an application from the mobile terminal through wireless communication while being connected with the mobile terminal installed with the application for input setting of the UID data before the terminal portion provided in the key head of the electronic key is in electrical contact with a data communication unit of the electronic locking device and is activated when the input key value coincides with the password when the key value is input by the button.

* * * * *